(No Model.)

E. L. HALL.
BEER COOLER.

No. 532,552. Patented Jan. 15, 1895.

WITNESSES  
Dan'l Fisher  
George Hemsley

INVENTOR  
Edward Lyman Hall,  
by W. J. Howard,  
Attys.

UNITED STATES PATENT OFFICE.

EDWARD LYMAN HALL, OF BALTIMORE, MARYLAND.

BEER-COOLER.

SPECIFICATION forming part of Letters Patent No. 532,552, dated January 15, 1895.

Application filed March 15, 1894. Serial No. 503,696. (No model.)

*To all whom it may concern:*

Be it known that I, EDWARD LYMAN HALL, of the city of Baltimore and State of Maryland, have invented certain Improvements in Beer-Coolers, of which the following is a specification.

In the description of the said invention which follows, reference is made to the accompanying drawings forming a part hereof and in which—

Figure 1:
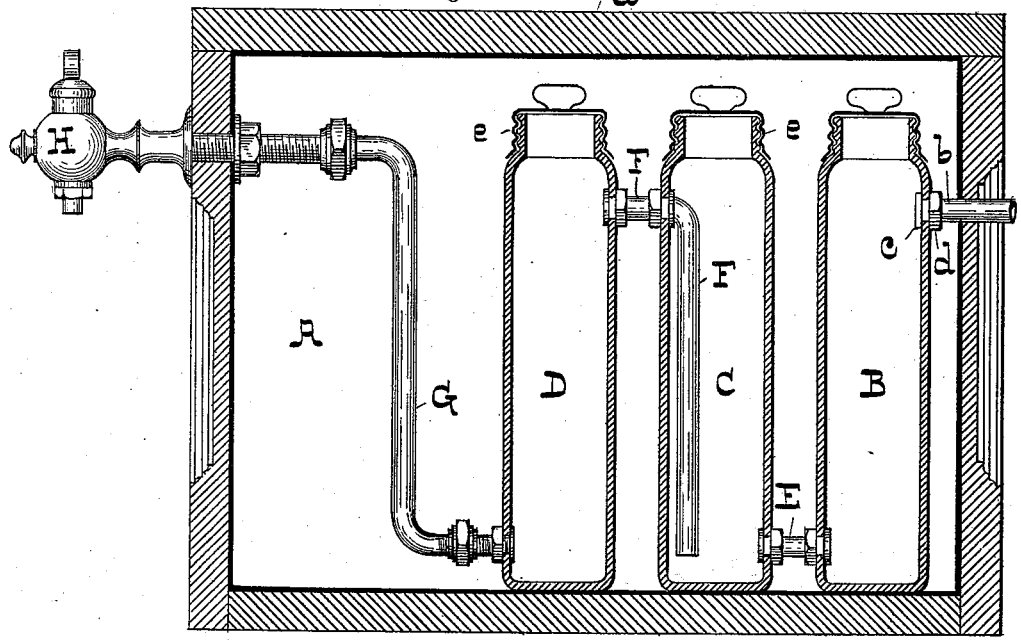
Figure 2:
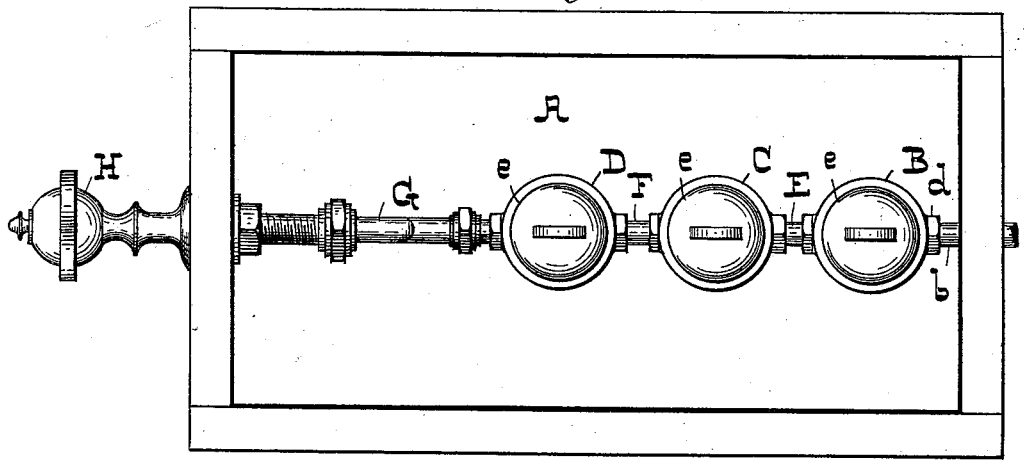

Figure 1 is a longitudinal section of the improved beer cooler, and Fig. 2 a top view of the same with the lid removed.

Referring to the drawings, A represents an ice box lined with zinc or other material to make it water tight. It has a lid $a$ which may be hinged or not as desired.

Within the ice box A are a series of cylinders or jars B, C and D, of glass, earthenware or porcelain. While I have shown only three jars, it is evident that the number employed may be increased to almost any extent.

The first jar B is furnished, near its upper end, with a pipe $b$, leading to a beer barrel or other source of beer supply under pressure, and to admit of the connection of this pipe to the jar, which as before stated is preferably of glass, earthenware or porcelain, the pipe has a flange $c$, and a nut $d$ exterior of the jar, and between these and the jar, are placed washers of rubber or other suitable material.

E is a pipe or tube which connects the lower part of the jars B and C together, and the fastening is formed in a manner similar to that before described in connection with the pipe $b$.

F is a pipe leading from near the bottom of the jar C to the upper part of the same through the wall of which it passes, and it extends to the upper part of the jar D. By this means, the lower part of the jar C is in communication with the upper part of the one D.

G is a pipe leading from the lower part of the jar D to near the top of the box A through the side or end wall of which it passes, and at that point it is provided with a faucet H.

The cylinders or jars are provided with screw caps $e$ whereby they are made water tight.

The space around the jars in the box A is packed with ice, and when communication is opened between the jars and the barrel, not shown, the cylinders or jars are filled with beer which becomes cooled.

The beer is drawn by opening the faucet H and the quantity taken from the jars is supplied from the barrel.

It will be understood that when beer is rapidly drawn, the jar B contains the warmest beer, and the one C, beer somewhat cooler, while the jar D holds the coolest, and it is from this one that the beer is immediately drawn; and it will be understood that in each jar the contents are not of uniform temperature, the beer in the lower part being cooler than that at the upper end of the jar. In view of this difference which exists in accordance with a law of nature, I supply the jar D from the bottom of all the others, thus taking for use the coolest beer in the receptacle.

It will be seen that in the jar C the beer enters and is discharged from the bottom, the warmer liquid being above the point where the current is affected. By this means, the beer in the upper part of the jar C is not used or drawn until, by the cooling effect of the ice, it becomes as cool as that in the lower part of the jar, or in other words, not until the temperature is uniform.

My object in making the jars of glass, earthenware or porcelain, is that these substances are more easily cleaned than metal, and by having the mouths of the jars nearly as large as their bodies, they can be easily cleaned by means of a swab.

I claim as my invention—

In a beer cooler, the combination of an ice box, a series of cylinders or jars with air tight covers, the first jar of the series being furnished at its upper end with a pipe leading to a supply of beer under pressure, and connected at its lower end to the lower end of the second jar of the series by a horizontal pipe, and the last jar of the series connected to the adjacent one by means of a pipe which leads from near its top to near the bottom of the said adjacent one, and a pipe with a drawing faucet leading from the bottom of the last of the series of jars, substantially as specified.

EDWARD LYMAN HALL.

Witnesses:
WM. T. HOWARD,
GEO. E. TAYLOR.